(12) United States Patent
Novosel et al.

(10) Patent No.: US 9,713,785 B2
(45) Date of Patent: Jul. 25, 2017

(54) AIR FILTRATION SYSTEM

(71) Applicant: ESTA Apparatebau GmbH & Co. KG, Senden (DE)

(72) Inventors: Michael Novosel, Heidenheim (DE); Bernhard Frank, Weissenhorn (DE)

(73) Assignee: ESTA Apparatebau GmbH & Co. KG, Senden (DE)

( * ) Notice: Subject to any disclaimer, the term of this patent is extended or adjusted under 35 U.S.C. 154(b) by 56 days.

(21) Appl. No.: 14/832,431

(22) Filed: Aug. 21, 2015

(65) Prior Publication Data

US 2016/0367932 A1    Dec. 22, 2016

(30) Foreign Application Priority Data

Jun. 22, 2015 (DE) .......................... 10 2015 109 999

(51) Int. Cl.
| | |
|---|---|
| *B01D 46/24* | (2006.01) |
| *B01D 50/00* | (2006.01) |
| *B01D 46/00* | (2006.01) |
| *B01D 45/08* | (2006.01) |

(52) U.S. Cl.
CPC ........... *B01D 50/002* (2013.01); *B01D 45/08* (2013.01); *B01D 46/0027* (2013.01); *B01D 46/0045* (2013.01); *B01D 46/2411* (2013.01)

(58) Field of Classification Search
CPC ... B01D 50/002; B01D 46/0027; B01D 45/08
See application file for complete search history.

(56) References Cited

U.S. PATENT DOCUMENTS 3,992,177 A * 11/1976 Welteroth .............. B01D 45/08
                                                            55/288
4,061,478 A * 12/1977 Hartwick ............... B01D 50/00
                                                           261/118

(Continued)

FOREIGN PATENT DOCUMENTS

| CN | 201 684 485 U | 12/2010 |
|---|---|---|
| DE | 25 33 827 A1 | 2/1977 |

(Continued)

*Primary Examiner* — Amber R Orlando
*Assistant Examiner* — Britanny Precht
(74) *Attorney, Agent, or Firm* — Renner, Otto, Boisselle & Sklar, LLP (57) ABSTRACT

An air filtration system with vertical construction includes a suction intake for taking in contaminated air and vertical channel. Contaminated air is taken in and conveyed downward through the vertical channel which includes a lateral opening, through which the air flow is deflected toward and conveyed through a material pre-separator. A process chamber having at least one filter element is provided downstream of the material pre-separator. A fan is provided downstream of the process chamber. The material pre-separator has an intake side and an outlet side for a particle-contaminated air flow and consists of several strip-shaped separating elements that are arranged vertically on top of one another. The separating elements are initially arranged from the top toward the bottom with an increasing positive angle relative to the vertical line and at least one lower separating element has a negative angle relative to the vertical line.

10 Claims, 6 Drawing Sheets

(56) References Cited

U.S. PATENT DOCUMENTS

| | | | | |
|---|---|---|---|---|
| 4,500,332 A | * | 2/1985 | Gillingham | B01D 45/06 55/332 |
| 5,979,507 A | * | 11/1999 | Kojima | B01D 45/08 138/39 |
| 2005/0150439 A1 | * | 7/2005 | Ryan | B01D 45/08 110/216 |
| 2006/0107634 A1 | * | 5/2006 | Ohlendorf | B01D 45/08 55/385.1 |
| 2014/0224123 A1 | | 8/2014 | Walters | |

FOREIGN PATENT DOCUMENTS

| | | |
|---|---|---|
| EP | 2 363 190 A1 | 9/2011 |
| FR | 2 778 580 A1 | 11/1999 |
| JP | H03-146 108 A | 6/1991 |

\* cited by examiner

AIR FILTRATION SYSTEM

This application claims priority of German Application No. 10 2015 109 999.3filed Jun. 22, 2015, which is hereby incorporated herein by reference.

The invention pertains to an air filtration system with vertical construction.

The function of air extraction and filtration systems for industrial applications such as, for example, factory buildings is frequently impaired by a particle-contaminated air flow. For example, a high particle content leads to premature clogging of the filters used in such extraction systems. Another problem, in particular, with air that is contaminated with welding fumes can be seen in that it still contains hot or glowing particles and particulates that can cause burning of the filter or parts of the system exposed to the air flow such as hoses or the like.

In extraction systems with the most space-saving constructive design possible, it would be desirable to realize a more effective and selective separation of particles by means of a material pre-separator.

The invention therefore is based on the objective of making available an air filtration system that has a simple and compact construction and allows the most effective selection of particles possible.

This objective is attained with an air filtration system according to the characteristics of claim 1.

The invention accordingly proposes an air filtration system with vertical construction, in which a suction intake for taking in air contaminated with particles to be separated is provided in the upper region of the system, in which a vertical channel is provided in the interior of the system and contaminated air being taken in is conveyed downward in the interior of the system through said vertical channel, in which the vertical channel features in the lower region of the system a lateral opening, through which the air flow is deflected toward and conveyed through a material pre-separator arranged in the region of the opening, in which a process chamber is provided in the air flow path downstream of the material pre-separator and receives the air flow from the material pre-separator, in which one or more filter elements is/are arranged in the process chamber, and in which a fan for driving the air flow is provided in the air flow path downstream of the process chamber, wherein said air filtration system is characterized in that the material pre-separator has an intake side and an outlet side for a particle-contaminated air flow and consists of several strip-shaped separating elements that are arranged vertically on top of one another, wherein the separating elements are initially arranged from the top toward the bottom with an increasing positive angle relative to the vertical line and at least one lower separating element has a negative angle relative to the vertical line. In this way, highly selective sorting of particles can be achieved by means of the air filtration system in a particularly effective fashion.

The invention ensures very effective cleaning such that the dust contamination of the air flow is substantially reduced and the filter elements are then only acted upon with fine dust particles. This leads to a significant extension of the useful life of the filter and to a reduction of the operating costs because less compressed air is required for filter cleaning and the service life of the filters is extended.

The majority of particles is already separated before the air flow reaches the filter elements and the useful life of the system is substantially extended due to the deflection of the air flow toward an impact-type particle separator arranged in the region of the opening, wherein this deflection causes heavier particles to fall down farther in the vertical channel whereas smaller particles still entrained by the air flow are decelerated in the impact separator and fall down in the impact separator.

A collection tray realized, in particular, similar to a drawer is advantageously provided underneath the vertical channel and/or the impact-type particle separator. In this way, the system can be very easily serviced and emptied.

The air volume flow is purposefully deflected due to the arrangement of the separating elements. A separation of the fractions (air and particles contained therein) is achieved in this way. The air flow is cleaned as a result thereof.

It is preferred that at least one of the separating elements features on its lower edge a lower channel that opens toward the outlet side. It is accordingly also preferred that at least one of the separating elements features on its upper edge an upper channel that opens toward the intake side.

The respective angles of inclination of the separating elements relative to the vertical line are advantageously chosen between 21° and 31° and between 31° and 41°, as well as between −7° and −13°.

According to a preferred embodiment of the invention, it is proposed that the separating elements are arranged behind and underneath one another with an overlap viewed from the intake side.

According to a variation of the invention, it is proposed that two separating elements with the same angle of inclination relative to the vertical line are arranged on top of one another.

On the intake side, the air flow preferably acts upon the material pre-separator from the front and/or from above.

The separating elements are advantageously formed by metal sheets.

According to a particularly advantageous embodiment of the invention, it is proposed that the opening width of the lower edge of the separating elements relative to a common vertical line decreases from separating element to separating element in the downward direction and once again widens on the bottom separating element.

Additional advantageous embodiments result from the other dependent claims or their potential subcombinations.

The invention is described in greater detail below with reference to the drawings. In these individual schematic drawings:

In these figures, identical or identically acting elements are identified by the same reference symbols.

Figure 1:
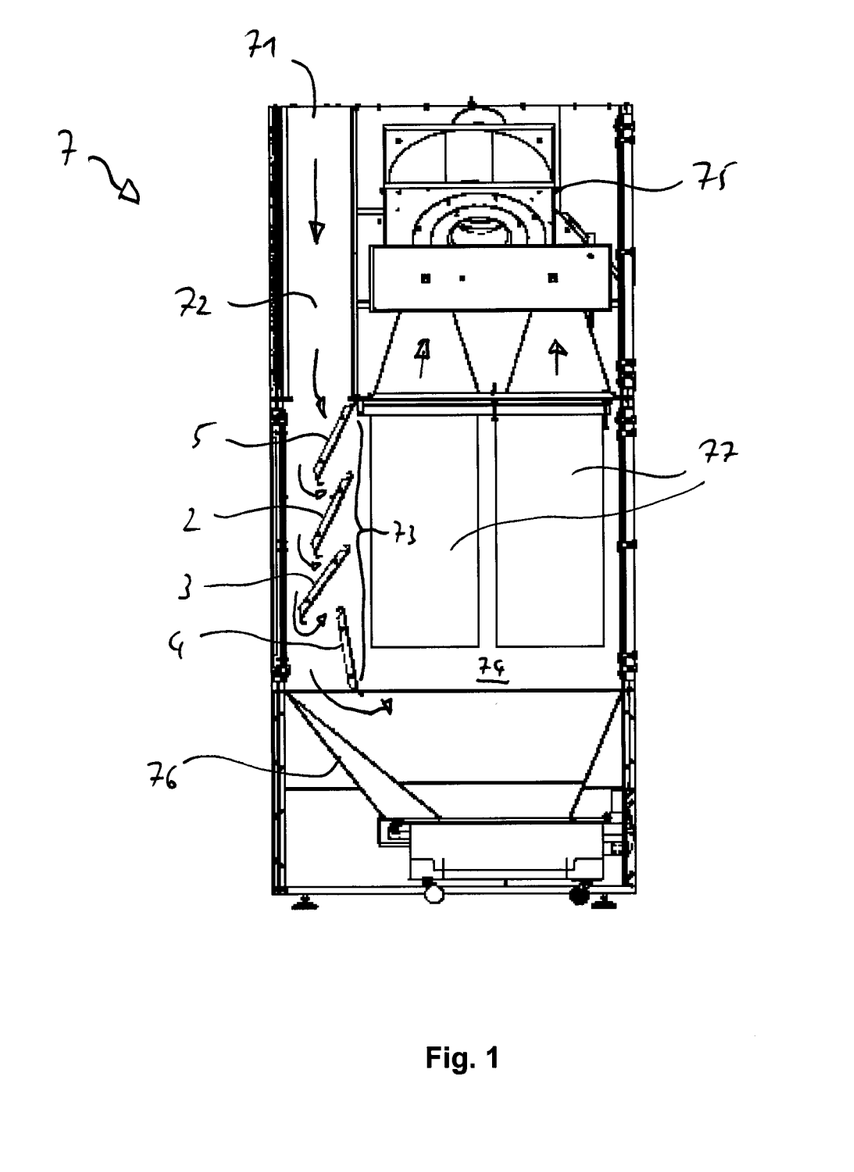
FIG. 1 shows a schematic section through the inventive air filtration system with material pre-separator.

FIG. 1 shows a schematic section through an inventive air filtration system 7.

Figure 2:
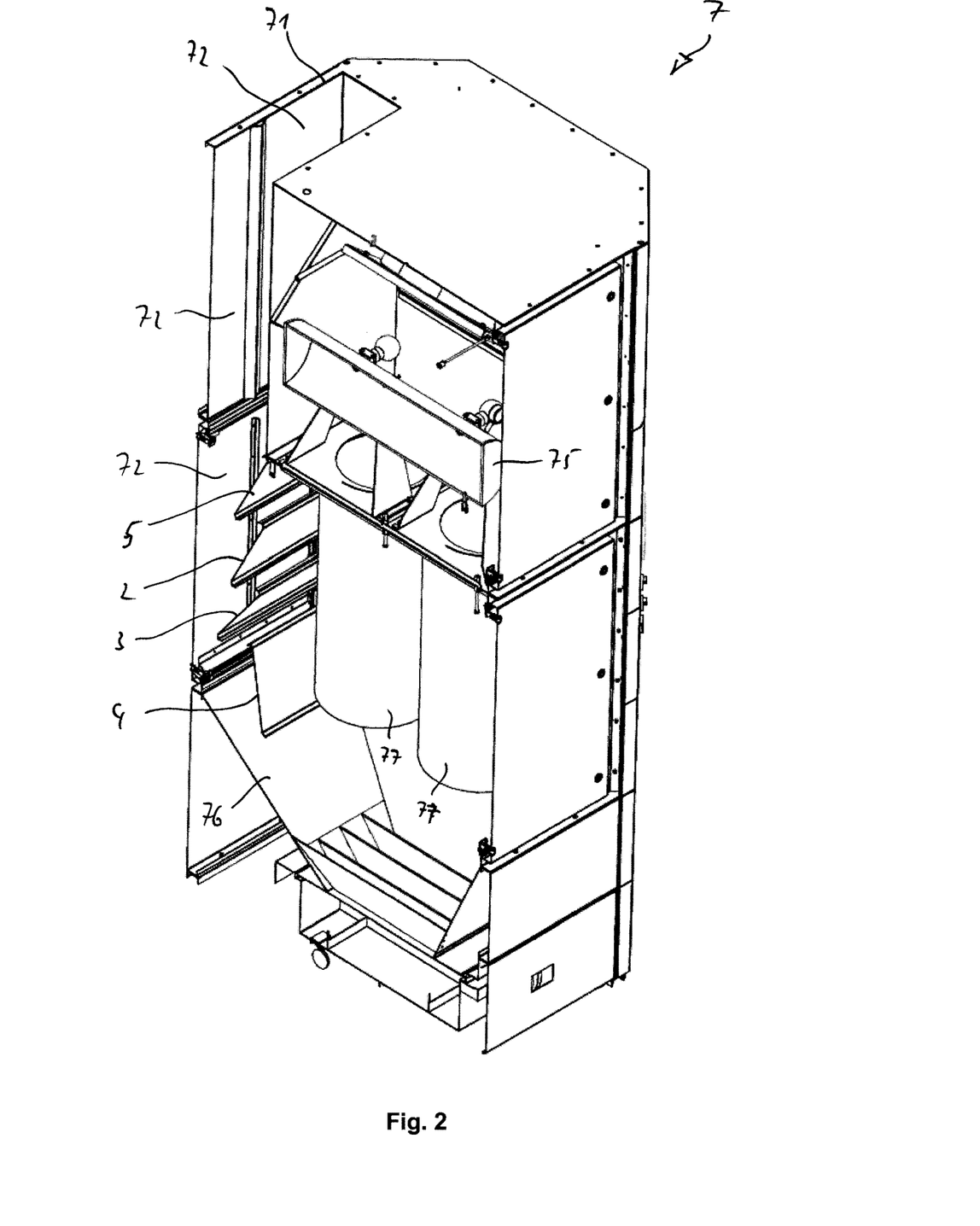
FIG. 2 shows a schematic section through the air filtration system according to FIG. 1 in the form of an oblique view.

FIGS. 1 and 2 show an exemplary air filtration system 7 with vertical construction, in which a suction intake 71 for taking in particle-contaminated air is provided in the upper region of the system on the upper side of the housing.

The internal construction of the system is illustrated in greater detail in FIG. 1. A vertical channel 72 is provided in the interior of the system and conveys the contaminated air being taken in vertically downward in the interior of the system, wherein the vertical channel 72 features in the lower region of the system a lateral opening 73, through which the air flow (illustrated in the form of arrows) is deflected toward and conveyed through a material pre-separator 1 that is arranged in the region of the opening and composed of separating elements 5, 2, 3 and 4.

This causes larger particles to be immediately separated because they do not follow the deflection of the air flow and fall down into the collection tray 76. The collection tray 76 is realized similar to a drawer that can be pulled out toward the outside.

A process chamber 74 receiving the air flow from the material pre-separator is provided in the air flow path downstream of the material pre-separator 1. In this case, several filter elements 77 are arranged in the process chamber 74, wherein the air flow is extracted through the filter elements 77 by means of a fan 75 that is arranged above the filter elements and drives the air flow.

Figure 3:
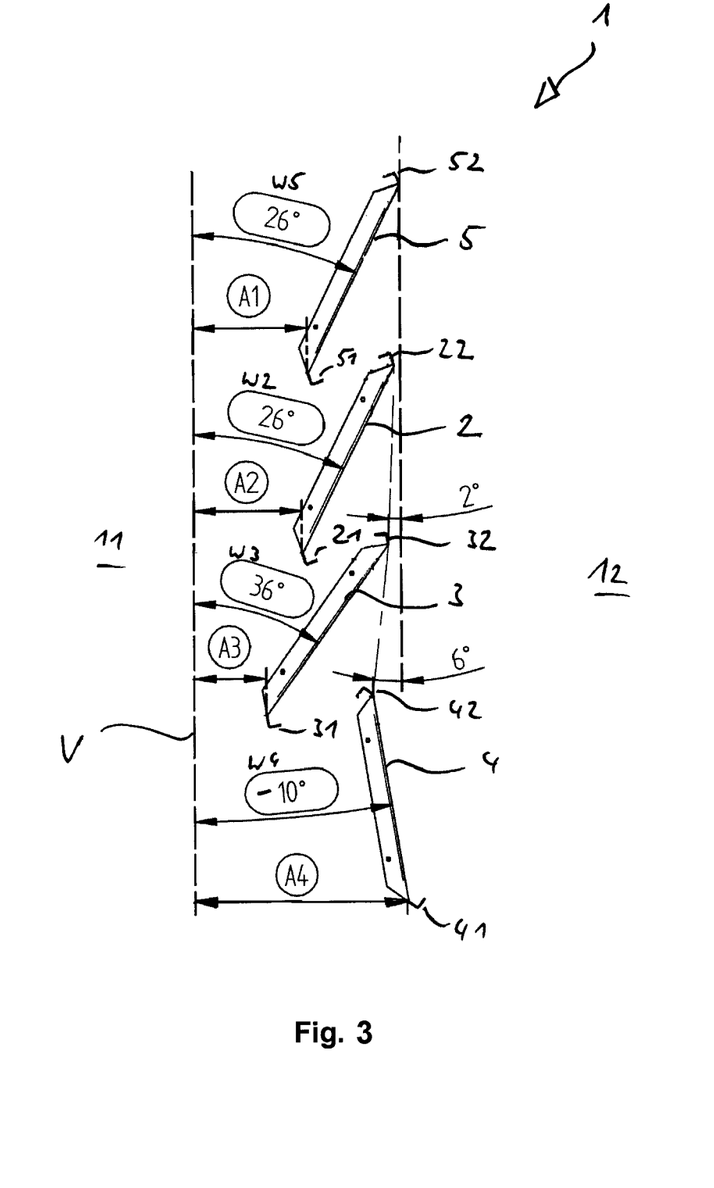
FIG. 3 shows a schematic side view of the material pre-separator.

FIG. 3 shows an explanatory side view of the material pre-separator 1, wherein the particle-contaminated air flow can pass through the material pre-separator 1 from an intake side 11 to an outlet side 12.

Figure 4:
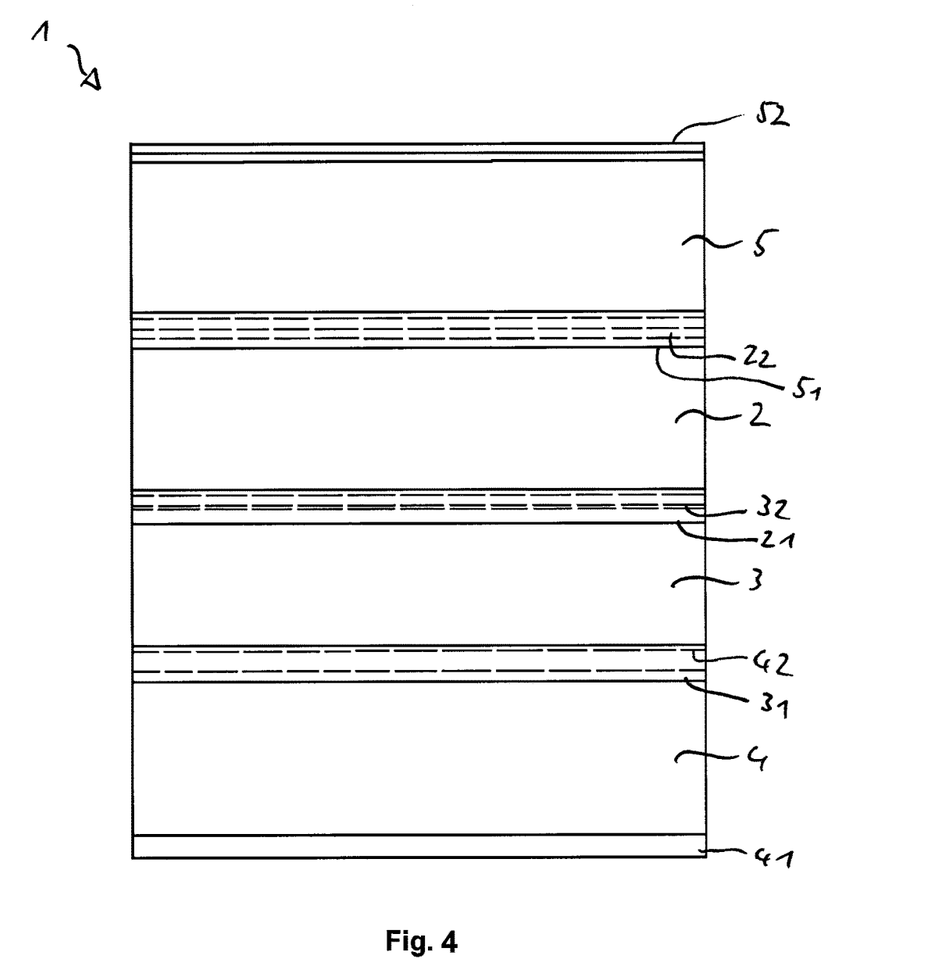
FIG. 4 shows the material pre-separator according to FIG. 3 in the form of a front view of the intake side.

In this case, separating elements 5, 2, 3, 4—which are formed by metal sheets in the example shown—are arranged vertically on top of one another. The separating elements 5, 2, 3, 4 are realized in the form of strips and arranged behind and underneath one another with an overlap viewed from the intake side 11 (in this respect, see also FIG. 4).

The separating elements 2, 3 and 4 form the central group of the material pre-separator. The separating elements 2, 3 are initially arranged from the top toward the bottom with an increasing positive angle W2, W3 relative to the vertical line V and a lower separating element 4 has a negative angle W4 relative to the vertical line V.

The angles of inclination of the separating elements 2, 3 and 4 relative to the vertical line were respectively chosen at 26°, 36° and −10° in the example shown. These angles proved to be very effective in system tests.

In the example shown, a separating element 5 with the same angle of inclination relative to the vertical line was additionally provided above the separating element 2 arranged thereunder.

On their lower edge, the separating elements 2, 3, 4, 5 feature a lower channel 21, 31, 41, 51 that opens toward the outlet side 12. On their upper edge, the separating elements 2, 3, 4, 5 accordingly feature an upper channel 22, 32, 42, 52 that opens toward the intake side 11.

Other positive effects are created by the edge profiles or channels that are located on the ends of the separating elements and also overlap in the horizontal and the vertical direction. Sharp air flow break-away edges can be prevented because the air can "adapt" to the edge profile on the lower end of the metal sheets. This improves the deflection.

On the upper end of the separating elements, the edge profile subjects the air flow to another deflection that in turn makes it possible to separate more particles.

Figure 5:
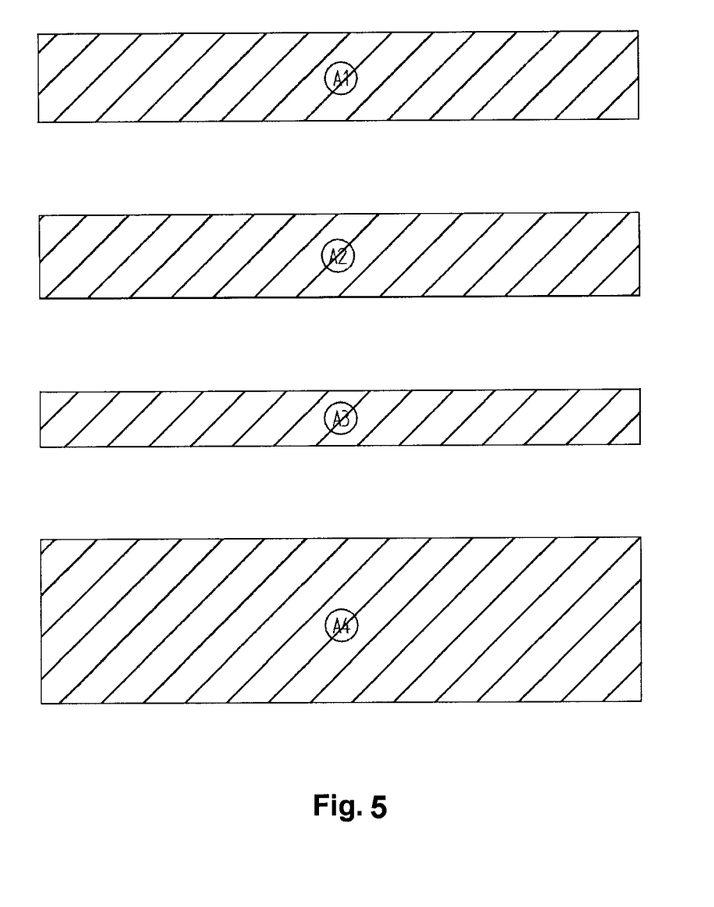
FIG. 5 shows a schematic illustration of the opening widths of the lower ends of the separating elements relative to a common vertical line.

FIG. 5 shows a view corresponding to FIG. 3, which elucidates that the opening width A1-A3 of the lower edge of the separating elements 5, 2, 3, 4 relative to a common vertical line V decreases from separating element to separating element 5, 2, 3 in the downward direction and once again widens (A4) on the bottom separating element 4.

An air classification effect of sorts is achieved due to the combination of cross-sectional narrowing and cross-sectional widening. This effect is most pronounced on the bottom metal sheet. The position of the bottom metal sheet also largely prevents already separated material from being returned into the air volume flow again.

Figure 6:
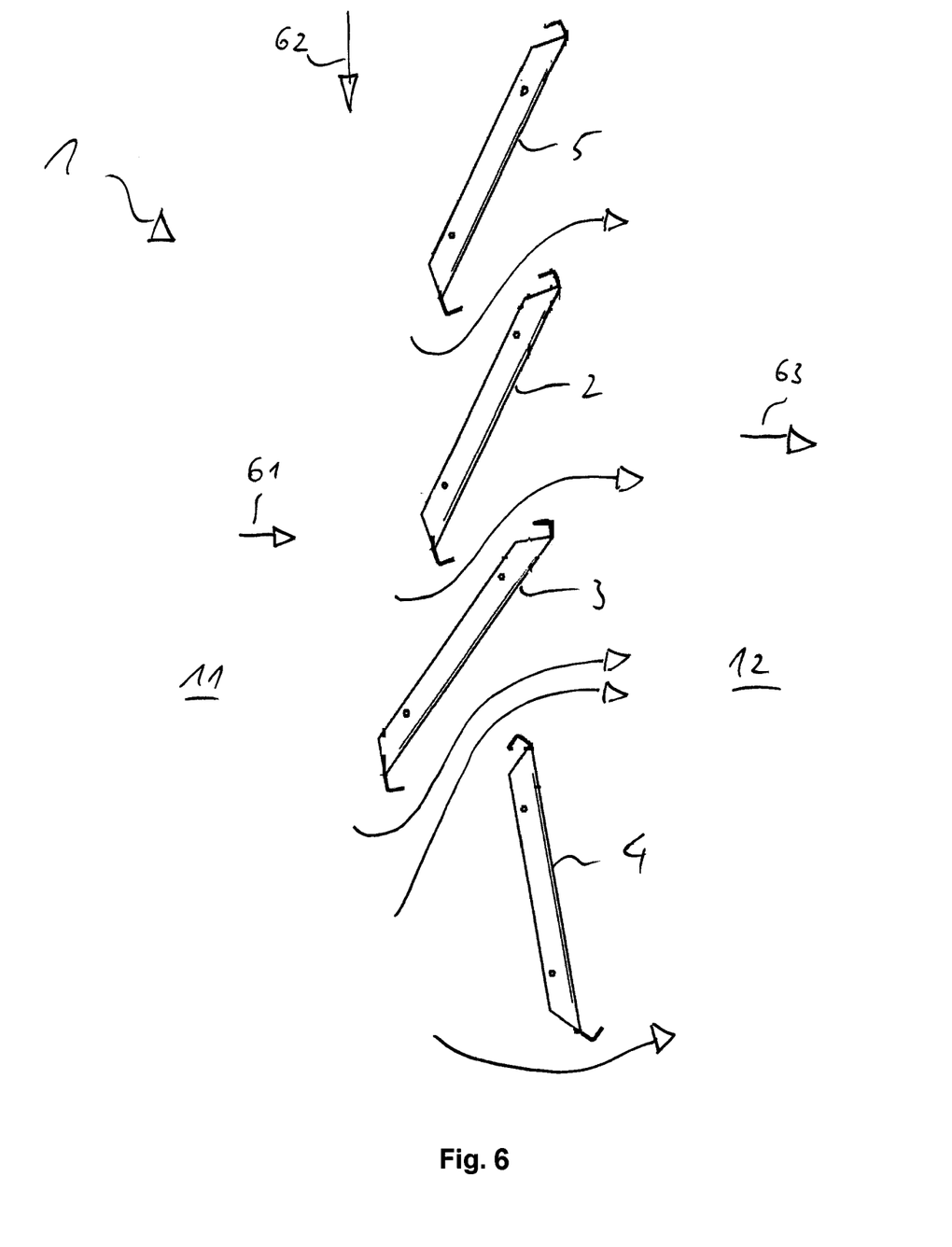
FIG. 6 shows a schematic illustration of the air flow through the material pre-separator from the intake side to the outlet side.

FIG. 6 once again shows the air flow path from the intake on the intake side 11, namely from the front 61 and primarily from above 62, and the discharge 63 on the outlet side 12. A sound separation of particles entrained by the arriving air flow 61, 62 is achieved upstream of and on the material pre-separator 1 due to the deflection on the separating elements 5, 2, 3, 4 and the change in direction from vertically downward to horizontal toward the discharge.

LIST OF REFERENCE SYMBOLS

1 Material pre-separator
11 Intake side
12 Outlet side
2 Separating element
21 Lower channel
22 Upper channel
3 Separating element
31 Lower channel
32 Upper channel
4 Separating element
41 Lower channel
42 Upper channel
5 Separating element
51 Lower channel
52 Upper channel
61 Inflow from front
62 Inflow from above
63 Discharge
7 Air filtration system
71 Suction intake
72 Vertical channel
73 Opening
74 Process chamber
75 Fan
76 Collection tray
77 Filter element
A1-A4 Opening width
Wi Angle of separating element relative to vertical line
V Vertical line

The invention claimed is:
1. An air filtration system with vertical construction,
in which a suction intake for taking in air contaminated with particles to be separated is provided in the upper region of the system,
in which a vertical channel is provided in the interior of the system and contaminated air being taken in is conveyed downward in the interior of the system through said vertical channel, in which the vertical channel features in the lower region of the system a lateral opening, through which the air flow is deflected toward and conveyed through a material pre-separator arranged in the region of the opening, in which a process chamber is provided in the air flow path downstream of the material pre-separator and receives the air flow from the material pre-separator, wherein one or more filter elements is/are arranged in the process chamber, in which a fan for driving the air flow is provided in the air flow path downstream of the process chamber, wherein the material pre-separator has an intake side and an outlet side for a particle-contaminated air flow and consists of several strip-shaped separating elements that are arranged vertically on top of one another, wherein the separating elements are initially arranged from the top toward the bottom with an increasing positive angle relative to the vertical line and at least one lower separating element has a negative angle relative to the vertical line.

2. The air filtration system according to claim 1, wherein a collection tray realized, in particular, similar to a drawer is provided underneath the vertical channel and/or the material pre-separator.

3. The air filtration system according to claim 1, wherein at least one of the separating elements features on its lower edge a lower channel that opens toward the outlet side.

4. The air filtration system according to claim 1, wherein at least one of the separating elements features on its upper edge an upper channel that opens toward the intake side.

5. The air filtration system according to claim 1, wherein the angles of inclination of the separating elements relative to the vertical line are respectively chosen between 21° and 31° and between 31° and 41°, as well as between −7° and −13°.

6. The air filtration system according to claim 1, wherein the separating elements are arranged behind and underneath one another with an overlap viewed from the intake side.

7. The air filtration system according to claim 1, wherein two separating elements with the same angle of inclination relative to the vertical line are arranged on top of one another.

8. The air filtration system according to claim 1, wherein the air inflow on the intake side takes place from the front and/or from above.

9. The air filtration system according to claim 1, wherein the separating elements are formed by metal sheets.

10. The air filtration system according to claim 1, wherein the opening width of the lower edge of the separating elements relative to a common vertical line decreases from separating element to separating element in the downward direction and once again widens on the bottom separating element.

* * * * *